Aug. 23, 1960   R. H. SAGER   2,949,609
AUXILIARY SUN GLASSES
Filed Sept. 30, 1957   2 Sheets-Sheet 1
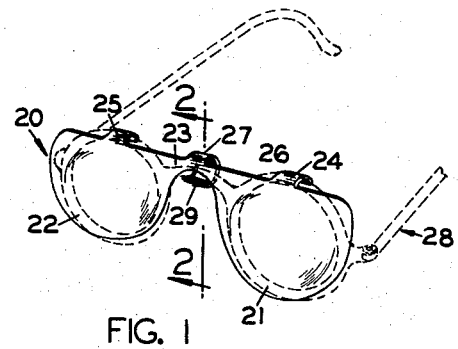
FIG. 1
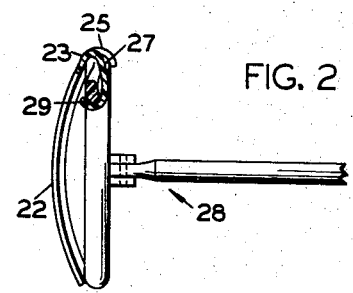
FIG. 2
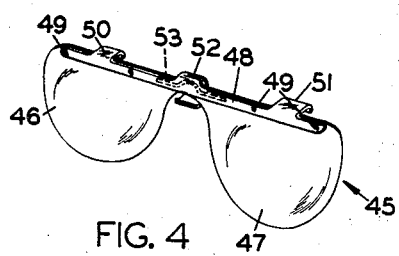
FIG. 4
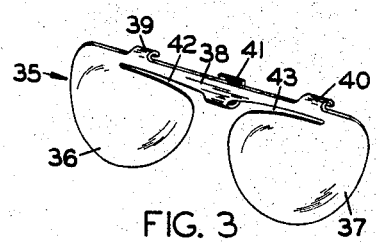
FIG. 3
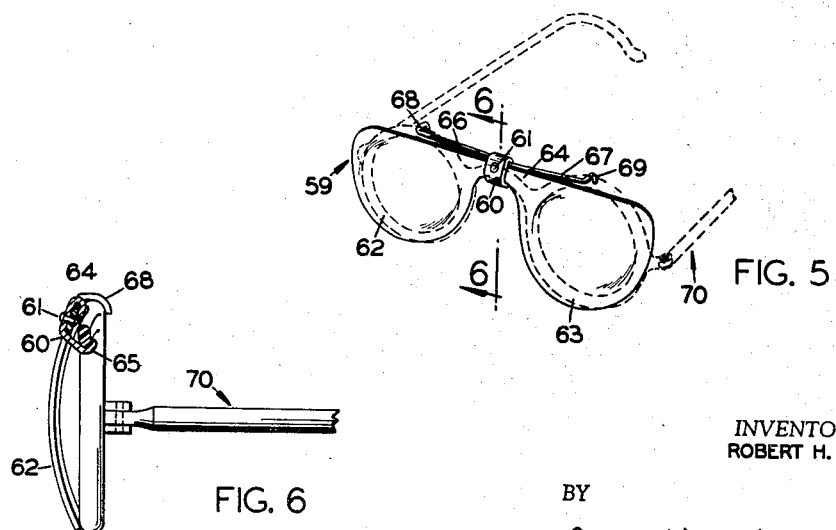
FIG. 5
FIG. 6
INVENTOR
ROBERT H. SAGER
BY
Gray, Mase & Dunson
ATTORNEYS

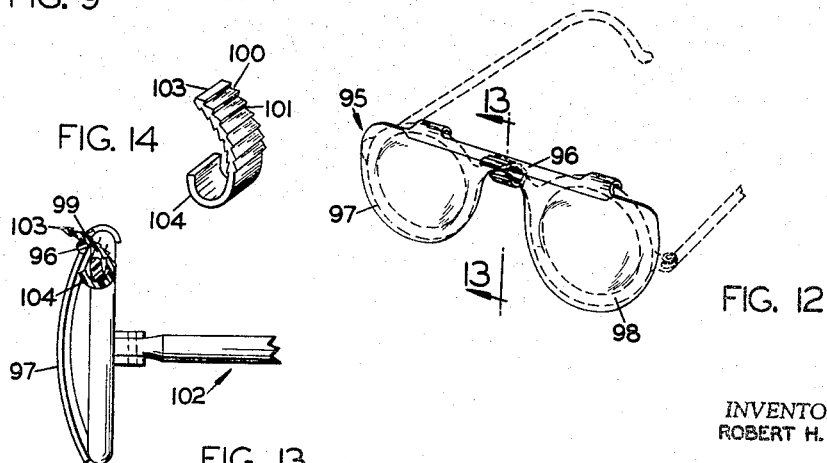

United States Patent Office 2,949,609
Patented Aug. 23, 1960

2,949,609

AUXILIARY SUN GLASSES

Robert H. Sager, 10298 Carnegie Ave., Cleveland, Ohio

Filed Sept. 30, 1957, Ser. No. 687,174

3 Claims. (Cl. 2—13)

This invention relates to auxiliary eyeglasses. More particularly, it relates to the auxiliary sunglasses which are adapted to "clip on" and be supported in the useful position by ordinary spectacles.

The usual construction of spectacles is universally known. Spectacles comprise a pair of lenses made from glass or other materials supported by mutual attachment to a bridge which is constructed to cross over the bridge of the wearer's nose, resting thereon and being supported thereby. At opposite sides each lens is connected to a bow, which is formed to fit over the wearer's ears and retain the spectacles from sliding off the bridge of the wearer's nose.

In order that the wearer of spectacles may have the benefit of protection from the sun's glare and the use of the visual aid of his spectacles at the same time, auxiliary sunglasses have been provided which conventionally clip on to ordinary spectacles by various means. One such prior construction comprises the use of peripherally positioned hooks on the frames of the sunglasses, which are adapted to hook over each lens of the spectacles. This prior construction is expensive to manufacture and requires an exacting fit on the spectacles with which they are used. Therefore, many sizes are required for universal usage as there are many forms and sizes of ordinary spectacles.

In this invention, clip-on sunglasses are provided which clamp on the ordinary spectacles by a "three point suspension" in which each sunglass lens is provided with a single flange attachment means, positioned to apply pressure to that lens at only one position or edge, and in which the bridge of the sunglasses connecting the lenses is provided with a single curved attachment means constructed to bend around the bridge of the ordinary spectacles and apply pressure against the bridge of the ordinary spectacles in a direction opposite to the direction of the pressure from the attachments on the lenses of the sunglasses. This clamping action between three points is provided by the elasticity and resilience of the attachment means on the bridge of the sunglasses and of the bridge itself.

Features of this invention are: the way in which complicated spring-loaded hook and clamps are not required; the way in which construction of clip-on sunglasses is simplified, both from the standpoint of manufacture and ease in attachment and transportation by the user; the way in which a positive clamping action is provided, negating the possibility of slippage either laterally or vertically in position on the spectacles; the way in which the weight of sunglasses may be reduced through the elimination of heavy metallic hooks and clamps; and the way in which the three-point clamping action of this invention may be provided in a construction that will fit almost all usual forms of ordinary spectacles.

To these and other ends, this invention comprises construction of sunglasses, the preferred forms of which are disclosed in the following description and attached drawings. Although the structure shown in detail refers with particularity to sunglasses, it is apparent that this invention should not be limited thereto. Many of the details of the invention apply with equal qualification to auxiliary glasses of other types or to other devices that it might be desirable to clamp on ordinary spectacles.

In the drawings:

Fig. 1 is a front perspective view of clip-on sunglasses embodying the construction of this invention;

Fig. 2 is a sectional elevational view taken along the line 2—2 of Fig. 1;

Fig. 3 is a front perspective view of clip-on sunglasses showing a modification of the embodiment of Fig. 1;

Fig. 4 is a front perspective view of another modification of the construction of sunglasses shown in Fig. 1;

Fig. 5 is a front perspective view of another form of construction of sunglasses embodying the features of this invention;

Fig. 6 is a sectional view taken along the line 6—6 of Fig. 5;

Fig. 7 is a front perspective view showing another clip-on construction of sunglasses embodying the features of this invention;

Fig. 8 is a sectional view taken along the line 8—8 of Fig. 7;

Fig. 9 is a front perspective view of yet another form of clip-on sunglasses embodying the features of this invention;

Fig. 10 is a sectional elevational view taken along the line 10—10 of Fig. 9;

Fig. 11 is a perspective view of an attachment member used in the embodiment of this invention shown in Fig. 9;

Fig. 12 is another form of the sunglasses of this invention;

Fig. 13 is a sectional elevational view taken along the line 13—13 of Fig. 12; and Fig. 14 is a perspective view of an attachment means used in the embodiment of this invention shown in Fig. 12.

By way of illustration of this invention, five species are shown. The five different species are disclosed in Figs. 1, 5, 7, 9, and 12. Figs. 3 and 4 show possible preferable modifications of the embodiment of Fig. 1.

Most sunglasses that are presently in use do not have any focal correction ground in the lenses. Therefore, even though, in other fields, the term "lens" signifies a transparent device of focal curvature, in the sunglasses art, the term "lens" may define simple and plain glass or plastic shields used only to reduce the glare and brightness of the sun's light.

Referring to Fig. 1 clip-on sunglasses designated generally as 20 comprise auxiliary lens portions 21 and 22 connected by a bridge portion 23. The sunglasses 20 are formed of one integral piece of translucent material and may be molded or formed in conventional well-known practices. Each lens 22 is provided with a formed attachment means 24 and 25, respectively, which are shown to be bent over from an upper horizontal edge 26 of the sunglasses 20. The attachment means 24 and 25 are formed to an outstanding flange position substantially perpendicular to the plane of the lenses of the sunglasses.

From the bridge portion 23 an outstanding attachment member 27 is formed. In order to better understand the construction and clip-on action of the sunglasses 20, a pair of ordinary or primary spectacles 28 has been indicated in phantom position behind the sunglasses 20. The attachment means 27 of the sunglasses 20 is formed to curve around the bridge of the spectacles 28 and to apply upward pressure against the bottom face thereof.

By means of the resilient, elastic pressure provided by the attachment means or hook 27 the ordinary spectacles are clamped between the outstanding flange attachment means 24 and 25 and the hook attachment means 27. These three attachment means comprise the sole means of holding and supporting the clip-on sunglasses 20 in position on the spectacles 28. The sunglasses are held by a "three point suspension" and may not move either up or down or laterally. Lateral movement is prevented by the position of the attachment means 27 on the bridge of the ordinary spectacles 28.

In order to put the sunglasses 20 into position on the spectacles, the central attachment means 27 and the bridge portion 23 are elastically deformed until a leading edge 29 passes under the bridge of the spectacles 28 during the simultaneous movement of the sunglasses 20 into position. When the sunglasses 20 are in position, the attachment means 27 is released to spring back to the clamped position shown in Fig. 1. During the attachment process the elasticity of the attachment means 27 and the bridge 23 of the sunglasses must in combination allow sufficient deflection for the sunglasses to be put into place.

Referring to Fig. 3, sunglasses 35 are provided having lens 36 and 37. Lens 36 and 37 are connected by a bridge portion 38. Outstanding attachment means 39 and 40 are provided on the upper edge of the sunglasses 35 and a curving attachment means 41 is centrally provided on the bridge 38. Attachment means 41 is shown as being connected to bridge 38 at the bottom instead of at the top as disclosed in Figs. 1 and 2. At the connection between the lens 36 and 37 and the bridge portion 38 are provided slots 42 and 43, respectively.

The sunglasses 35 of the embodiment of the invention shown in Fig. 3 operate in the same manner and are attached in the same manner as the sunglasses 20 shown in Fig. 1. However, the construction of the sunglasses 35 may be used when the material of manufacture is too rigid and not of sufficient resilience to allow the proper deformation in the bridge portion 38 of sunglasses 20 for attachment on spectacles 28. The slots 42 and 43 extend the length of the bridge portion 38 to a degree sufficient to allow enough deformation with a more rigid material.

It has been found that the central attachment means may be connected to either the top (Fig. 1) or the bottom (Fig. 3) of the bridge portion of the sunglasses without affecting the successful operation of the invention, provided that the "three-point" suspension constrution is maintained.

Referring to Fig. 4, clip-on sunglasses 45 are provided having oppositely disposed lenses 46 and 47. A separately formed bridge member 48 connects the lenses 46 and 47 and is attached thereto by suitable means 49 such as rivets or heat-sealing techniques. Bridge member 48 is provided with attachment means 50, 51, and 52 of a form and purpose disclosed for the sunglasses of Fig. 1. The bridge member 48 may be constructed of a molded plastic or of metal. If it is constructed of molded plastic, a resilient wire spring member 53 may be molded therein to provide the proper elastic characteristics for the required deformation in attaching the sunglasses 45 to a pair of ordinary spectacles.

Referring to Figs. 5 and 6 another form of the clip-on sunglasses 59 of this invention are shown in which a separate central attachment member 60 is fastened, as by a rivet 61, to a pair of sunglasses lenses 62 and 63 at a bridge portion 64. The attachment member 60 is formed with a backwardly projecting hook portion 65 and carries outer spring arms 66 and 67. Spring arms 66 and 67 are formed with outwardly projecting attachment means 68 and 69, respectively, which are formed to contact the upper edge of an ordinary pair of spectacles 70.

The sunglasses 59 are clipped on to the ordinary spectacles 70 in a manner similar to that disclosed for the sunglasses 20 of Fig. 1. The necessary resilience to provide the deformation for engagement by the three-point suspension is provided in the spring arms 66 and 67 which deflect while the sunglasses are being slipped into position.

Referring to Figs. 7 and 8, clip-on sunglasses 75 comprising lenses 76 and 77, and bridge portion 78 are provided with integral attachment means 79 and 80 of a construction previously described in detail for the sunglasses 20 shown in Fig. 1. Attachment means for attaching the sunglasses 75 to a pair of ordinary spectacles 82 is provided by a curled spring member 83 connected in slots 84 of bridge portion 78. Curled spring 83 is unrolled and hooked around the bridge portion of ordinary spectacles 82 when the sunglasses 75 are attached in their proper position, as shown in Fig. 8. Spring 83 may be of metal or of a properly constituted plastic material which will conveniently uncurl and roll around by action of the finger tips to provide the required hooking action and upward force necessary for the effective three-point suspension system of this invention.

In the embodiment of this invention shown in Figs. 9, 10, and 11, the central attachment means between sunglasses 85 and ordinary spectacles 86 is provided at a bridge portion 87 by means of an adjustable hook member 88. As most clearly shown in Fig. 11, hook member 88 is provided with a plurality of notches 89 which are constructed with a throat 90 therebetween which is received by sliding fit in a slot 91 in the edge of the bridge portion 87. At one end, hook member 88 is provided with a curved finger 92 which resiliently curls around the bridge portion of the ordinary spectacles 86. Attachment flange means 93 and 94 are formed from the upper edge of the sunglasses 85. These attachment flange means 93 and 94 are shown without the curvature disclosed in the embodiments of Figs. 1 and 7. While a curved-end form may be preferred, either end configuration may be used.

Sunglasses 85 are fastened into place on the ordinary spectacles 86 in the same manner as previously described embodiments of the invention, although in the initial attachment the user may adjust the tension of attachment of finger 92 by means of selecting which pair of slots 89 will be used in conjunction with groove 91. This selection is based on the shape of the user's spectacles and provides a convenient means of providing a custom fit in the sunglasses of this invention.

Referring to Figs. 12, 13, and 14, clip-on sunglasses 95 are shown having a bridge portion 96 connecting auxiliary lenses 97 and 98. Bridge portion 96 is provided with a slot 99 through which is disposed an attachment means 100. Attachment means 100, which is most clearly shown in Fig. 14, is provided on opposite sides with laterally disposed serrations 101, and is formed of a generally curvilinear shape being semirigid in physical characteristics.

In the position of attachment on a pair of ordinary spectacles 102, attachment means 100 curves around and engages the bridge portion thereof with a hooked end 104. In this position of engagement on the bridge portion, the attachment means 100 is cocked in the slot 99 to a position that the serrations 101 engage the edges of the slot 99 retaining the attachment means 100 from movement. The hooked end 104 of engagement means 100 is placed over the bridge portion of spectacles 102 with the sunglasses 95 in proper position on the spectacles 102. An outward projecting end 103 is grasped between the fingers by the user and an outward force is applied. This draws the sunglasses 95 snugly into position against the spectacles 102. When the end 103 is released the cocked position of engagement member 100 causes serrations 101 to engage edges of the slot 99, preventing reentrance into slot 99 and loss of tension on engagement means 100. When the wearer wishes to release the sunglasses, engagement means 100 is flexed in the slot to an uncocked position such that the serrations 101 no longer engage the edges of the slot 99 and the tension on engagement member 100 is released. The hooked portion 104 may be disengaged and the sunglasses removed.

It will be seen that applicant's invention comprising a clip-on construction wherein attachment of the sunglasses to ordinary spectacles is made by a three-point suspension system comprising a central engagement point on the bridge portion of the ordinary spectacles, and oppositely disposed engagement points on the lens portions of the ordinary spectacles, provides a unique, simplified construction that is susceptible of being manufactured in several forms which in themselves provide unique innovations in the field of clip-on sunglasses.

It will be understood, of course, that, while the forms of the invention herein shown and described constitute the preferred embodiments of the invention, it is not intended herein to illustrate all of the possible equivalent forms or ramifications of the invention. It will also be understood that the words used are words of description rather than of limitation, and that various changes, such as changes in shape relative size, and arrangement of parts may be substituted without departing from the scope or spirit of the invention herein disclosed.

What is claimed is:

1. Clip-on auxiliary eyeglasses for attachment to primary spectacles having a pair of oppositely disposed lens portions centrally joined by a horizontal bridge and all being in substantially the same vertical plane, comprising: a pair of auxiliary lens portions with a central connecting horizontal bridge joined to the adjacent edges of the lens portions and all being substantially in the same vertical plane, said auxiliary eyeglasses being adapted to be clamped on the primary spectacles with the planes thereof in fixed substantially parallel positions by a three-point contact clip arrangement, said three-point contact clip arrangement consisting of first and second lens portion engagement clips, each of which is on an edge of each of said auxiliary lens portions and projects laterally from the plane thereof and has a contact point for contacting with a corresponding contact point at the edge of each of said primary spectacles lens portions, the two lens portion engagement clips applying a clamping force in one direction vertically in the plane of the primary spectacles, and a third bridge-engaging clip projecting laterally from the plane of the bridge of said auxiliary glasses in the same lateral direction as said first and second clips to engage the primary spectacle bridge at a contact point to apply a clamping force in one direction vertically in the plane of the primary spectacles, said third clip being resilient and vertically deformable to curl around and engage the bridge of said primary spectacles at an edge which is opposed to the edges of said primary lens portions contacted by said first and second clips so as to apply a clamping force in a vertical direction which is opposite to that direction in which said first and second clips apply their vertical clamping force so as to clamp said primary spectacles between the three clips of said auxiliary eyeglasses, the vertical distance between the contact points of each of said first and second clips and the contact point of said third clip of said auxiliary glasses being normally less than the vertical distance between the corresponding contact point of each of said lens portions and said bridge of said primary spectacles whereby the resilient deformation of said third clip is necessary to clip the auxiliary glasses to said primary spectacles and to retain them in place thereon.

2. Clip-on auxiliary eyeglasses according to claim 1 in which the bridge of said auxiliary eyeglasses is vertically resilient and flexible so that it is deformable with said third clip which is in the form of a hook to clamp the auxiliary eyeglasses to the primary spectacles, said first and second clips being along the tops of said auxiliary lens portions for engagement with the corresponding tops of the primary lens portions, and said hook being engageable beneath said primary bridge portion.

3. Clip-on auxiliary eyeglasses according to claim 1 in which each of said first and second clips is in the form of an engagement flange outstanding to the plane of said auxiliary lens portion at a position along the top thereof, and the connecting bridge between said auxiliary lens portions is a resilient flexible bridge portion which has said third clip in the form of a unitary one-piece elastic hook outstanding from the plane of said auxiliary lens portions and curving upwardly for curling under and engaging beneath the bridge of said primary spectacles.

References Cited in the file of this patent

UNITED STATES PATENTS

| | | |
|---|---|---|
| 1,310,077 | Heaford | July 15, 1919 |
| 1,433,637 | Marshall | Oct. 31, 1922 |
| 2,274,791 | Huggins | Mar. 3, 1942 |
| 2,413,193 | Robblee | Dec. 24, 1946 |
| 2,516,764 | Ehlert | July 25, 1950 |
| 2,668,952 | Kobashikawa | Feb. 16, 1954 |
| 2,714,717 | Allman | Aug. 9, 1955 |